(No Model.)

C. A. MUDDIMAN.
HOSE COUPLING.

No. 339,109.  Patented Mar. 30, 1886.

Witnesses:
Chas. J. Williamson,
Henry C. Hazard.

Inventor:
Chas. A. Muddiman, by
Crindle & Russell, his Attys.

United States Patent Office.

CHARLES A. MUDDIMAN, OF WASHINGTON, DISTRICT OF COLUMBIA.

HOSE-COUPLING.

SPECIFICATION forming part of Letters Patent No. 339,109, dated March 30, 1886.

Application filed September 14, 1885. Serial No. 177,677. (No model.)

*To all whom it may concern:*

Be it known that I, CHARLES A. MUDDIMAN, of Washington, in the District of Columbia, have invented certain new and useful Improvements in Hose-Couplings; and I do hereby declare that the following is a full, clear, and exact description thereof, reference being had to the accompanying drawings, in which—

Figure 1:
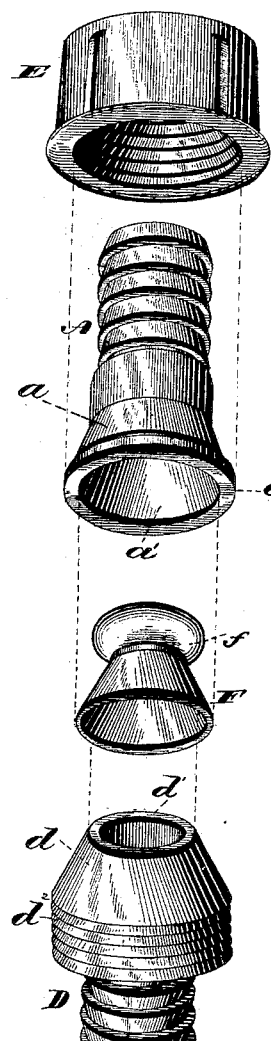
Figure 2:
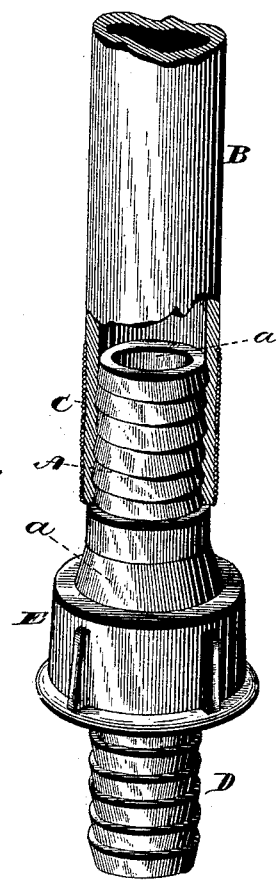
Figure 3:
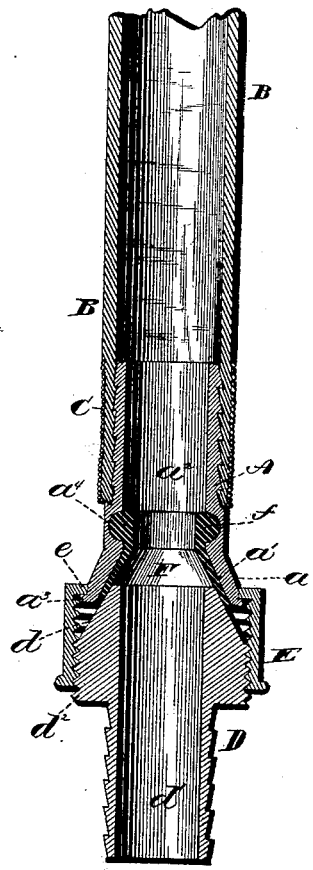
Figure 4:
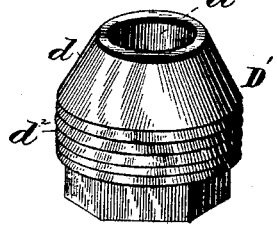
Figure 5:
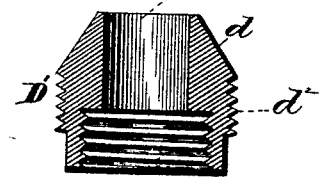

Figure 1 is a perspective view of the parts of my coupling separated from each other. Fig. 2 is a like view of the same united. Fig. 3 is a central longitudinal section of said coupling. Fig. 4 is a perspective view of a supplemental plug for use upon the plug of an ordinary street-washer, and Fig. 5 is a vertical central section of the same.

Letters of like name and kind refer to like parts in each of the figures.

In the use of hose for liquids it has heretofore been customary, in connecting two pieces together, or when connecting the hose with a plug, to employ couplings having square abutting ends, and to depend upon an elastic washer placed between the same for the production of a joint; but such means have proved defective, especially in connection with hose employed for watering lawns, sprinkling streets, &c., which is usually manipulated by inexperienced persons.

The object of my invention is to enable a joint to be easily and quickly made between sections of a hose or between a hose and a plug; and to this end said invention consists in the construction and combination of parts, substantially as and for the purpose hereinafter set forth.

In the carrying of my invention into practice a thimble, A, having the usual grooved periphery is inserted into the end of a hose, B, and confined therein by wire C, wound around the exterior of said hose, or by any other means ordinarily employed. The projecting end $a$ of the thimble A has a general bell shape, and within its interior is provided with a conical face, $a'$, that at its inner end is merged in the axial opening $a^2$ of said sleeve. The opposite thimble, or, if part of a hydrant, the plug D, has a conical face, $d$, formed upon its end, which face corresponds to and is adapted to fit within said conical face $a'$, whereby the axial opening $d'$ within said plug will be caused to coincide with and form a continuation of said opening $a^2$. The periphery of the plug D is somewhat larger in diameter than the end of the thimble A, and is provided with a screw-thread, $d^2$, and over the same is fitted a sleeve, E, which is threaded interiorly. Said sleeve is swiveled upon said thimble A, in the usual way, the latter being provided at its end with a radially outward projecting flange, $a^3$, that is engaged by a radially inward projecting flange, $e$, which is formed at the upper end of said sleeve. If, now, the hollow conical end of the thimble A is placed over or upon the conical end of the plug D, and the sleeve E screwed down around the latter, said parts will be firmly bound together, and their bearing-faces $a'$ and $d$ will be held in contact.

In order that a tight joint may be formed between the thimble A and plug D, I place between the faces $a'$ and $d$ a rubber washer, F, which conforms to the shape of said faces, and by the action of the sleeve E is compressed between the same.

To prevent displacement and loss of the washer F, it is loosely attached to the thimble A by means of a rib, $f$, that is formed upon the periphery at the upper end of said washer, and fits into a corresponding circumferential recess, $a^4$, which is provided within the axial opening $a^2$ of said thimble. Thus constructed, said washer may be readily placed in or removed from position when desired, as its enlarged part is easily compressed while passing through the neck of said recess $a^4$; but the connection between said parts is sufficient to prevent their accidental separation during any ordinary use of a hose.

It will be seen that, if desired, the elastic washer F may be readily attached to the plug D instead of the thimble A, for which purpose it will only be necessary to provide a rib at the lower end upon the inner side of said washer and a corresponding groove within the periphery of said plug.

For use with an ordinary street-washer, I employ a supplemental plug, D', (shown in Figs. 4 and 5,) which is like the plug D, before described, except that instead of the grooved lower end for insertion within a hose said plug D' has within its lower portion a threaded interior, $d^3$, that is adapted to fit over the plug of such street-washer. Said plug D', after having been placed in position, need not be removed with the hose.

Having thus described my invention, what I claim is—

1. In combination with the female part of a coupling having the conical bearing-surface and an annular groove beyond such surface, the hollow conical elastic washer fitting over the bearing-surface and provided with an annular rib to engage the groove within the coupling, substantially as and for the purpose specified.

2. A hose-coupling provided with corresponding male and female conical bearing-surfaces, in combination with a conical elastic washer fitting and adapted to be compressed between such bearing-surfaces, and having a portion interlocking with a part of one of the coupling halves beyond the bearing-surface thereof, so as to attach it to such part of the coupling, substantially as and for the purpose described.

3. The thimble A, having the conical face $a'$ and circumferential recess $a^3$ within, and the threaded sleeve E, journaled upon said thimble, in combination with the plug D, provided with the conical face $d$ and threaded exteriorly, and with the conical elastic washer F, having the rib $f$, substantially as and for the purpose shown and described.

In testimony that I claim the foregoing I have hereunto set my hand this 7th day of September, A. D. 1885.

CHAS. A. MUDDIMAN.

Witnesses:
GEO. S. PRINDLE,
HENRY C. HAZARD.